United States Patent [19]

Trostel, Jr.

[11] 3,979,214

[45] Sept. 7, 1976

[54] SINTERED ALUMINA BODY

[75] Inventor: Louis J. Trostel, Jr., Princeton, Mass.

[73] Assignee: Norton Company, Worcester, Mass.

[22] Filed: May 5, 1975

[21] Appl. No.: 574,448

Related U.S. Application Data

[63] Continuation-in-part of Ser. No. 345,550, March 28, 1973, abandoned.

[52] U.S. Cl. .................................. 106/44; 106/57; 106/65; 264/60
[51] Int. Cl.² ................ C04B 35/56; C04B 35/48; C04B 35/70
[58] Field of Search ............. 106/44, 57, 65; 264/60

[56] References Cited
UNITED STATES PATENTS

| 3,342,615 | 9/1967 | Miller | 106/44 |
|---|---|---|---|
| 3,454,385 | 7/1969 | Amero | 106/65 X |
| 3,607,162 | 9/1971 | Bockstiegel | 106/65 X |
| 3,671,275 | 6/1972 | Gates et al. | 106/65 X |
| 3,725,094 | 4/1973 | Levy et al. | 106/65 X |
| 3,759,725 | 9/1973 | Steen | 106/44 |
| 3,775,139 | 11/1973 | Gamble et al. | 106/44 X |

*Primary Examiner*—Winston A. Douglas
*Assistant Examiner*—Mark Bell
*Attorney, Agent, or Firm*—Rufus M. Franklin

[57] ABSTRACT

A polycrystalline monolithic sintered alumina refractory body (for use as kiln furniture, and crucibles or nozzles for containment of molten metal) is of fine crystalline sintered aluminum oxide including 15 to 44% by weight of grains of silicon carbide dispersed throughout, such silicon carbide preferably having a sizing between 6 and 46 mesh, but in any case at least 75% being coarser than 100 mesh, such bodies having superior thermal stability and shock resistance.

6 Claims, No Drawings

SINTERED ALUMINA BODY

RELATION TO OTHER APPLICATIONS

This application is a continuation-in-part of my co-pending application Ser. No. 345,550, filed Mar. 28, 1973, now abandoned.

BACKGROUND OF THE INVENTION

Sintered alumina bodies are excellent refractories for use as kiln furniture, but suffer from cracking or spalling when subjected to rapid temperature changes. The object of the present invention is to improve the thermal shock resistance of sintered alumina bodies by incorporation of coarse grained silicon carbide in the bodies.

Prior patents have suggested the incorporation of silicon carbide in alumina bodies. U.S. Pat. No. 2,770,552 teaches adding 17.5 to 25% silicon carbide to alumina, and firing shaped bodies formed therefrom at 3,000°F and higher. Such bodies are disclosed as having better high temperature strength and resistance to breakage than silicon carbide or aluminum oxide bodies. Because of the relatively coarse alumina employed a relatively high firing temperature is required by Pieper to achieve acceptable strength in the body. Such firing converts part of the silicon carbide to silica which in turn reacts with some of the alumina to form mullite, tending to cement the body together. Another patent, to Davies et al, 3,230,100 teaches the use of from 50 to 70% of silicon carbide in an alumina-silica system.

SUMMARY OF THE INVENTION

The present invention provides a body of lower modulus of elasticity and higher thermal shock resistance than the prior art, such as disclosed in the patents described above, by providing an entirely self bonded alumina structure containing coarse inclusions of silicon carbide particles. Formation of mullite is avoided by including substantially no silica in the mix and by firing at a temperature low enough such that formation of silica by oxidation of the silicon carbide is avoided. Adequate strength is achieved in such low temperature firing by including in the mix sufficient very finely divided, active alumina, such that sintering to provide the required strength in the finished product is achieved at temperatures below 1535°C. The resulting product although having a modulus of elasticity of about 1/3 that of an equivalent sintered alumina body, suffers no degradation of strength upon heating as high as 1250°C and has higher thermal conductivity and thermal shock resistance than prior art bodies containing the same proportions of alumina and silicon carbide.

An essential aspect of the present invention is that the individual particles of silicon carbide be separate from each other and be surrounded by a continuous alumina matrix. This condition will be satisfied if the silicon carbide content is less than 50% by volume (considering only the solids content of the product). This is equivalent to 44%, by weight of silicon carbide. Thus the upper limit of silicon carbide content in the product of this invention is 44% by weight. The alumina content of this invention ranges from 56 to 85% by weight.

DESCRIPTION OF SPECIFIC EMBODIMENT OF INVENTION

A preferred mix for the production of plates and saggers for supporting refractory ware in a kiln was made as follows:

| | |
|---|---|
| Silicon carbide - through 10 on 24 mesh | 35% |
| Tabular alumina - through 28 mesh | 22% |
| Tabular alumina - through 100 mesh | 20% |
| Tabular alumina - through 325 mesh | 8% |
| Alcoa A-15 S.C. "Reactive Alumina" (2.5 micron average particle size) | 15% |
| Dextrine | 1 part/100 parts of dry mix |
| Water | 3 parts/100 parts of dry mix |

Mesh sizes referred to above are standard U.S. Sieve sizes, designated in terms of number of openings per lineal inch. Tabular alumina is a standard article of commerce produced by calcination of Bayer process alumina. It is alpha alumina of very high purity.

An essential ingredient of the above mix which must be present in an amount between 10 and 40% of the total dry contents of the mix is reactive alumina, which is a high purity alpha alumina powder having an average particle size of less than 4 microns.

The above mix is charged into molds of desired configuration, pressed at three tons per square inch pressure, dried at 180°F, and fired to 1450°C. A suitable firing schedule is 100°C per hour rise to 1450°, a 4 hour hold, and a normal cooling in the kiln of 10 hours to room temperature. Instead of pressing to shape, the mix may be sludge cast.

In addition to kiln furniture, the mix is suitable for forming metal melting crucibles and nozzles, or other functional shapes which in use may be subjected to rapid changes in temperature (i.e., thermal shock).

Although the above specific description of a preferred process for producing the invention represents a preferred mode, variations are contemplated. In any case the silicon carbide content should be between 15 and 44% by weight with at least 75% of the particles being coarser than 100 mesh, and preferably the silicon carbide is all between 6 mesh and 46 mesh in size (that is, all of the material will pass a 6 mesh screen but be retained on a 46 mesh screen).

In the preferred product the alumina should be of high purity, containing no more than 4% silica, 0.1% soda, 0.5% iron oxide, calculated as $Fe_2O_3$, and no more than 0.5% total of RO type oxides, e.g. CaO, MgO, MnO, etc.). However inert metal oxide such as sintered or fused zirconium oxide, or alumina-zirconia may be substituted for up to 20% of the aluminum oxide. Where such substitution is made for an equivalent product, the limits of silicon carbide content should be recalculated to provide the same amount of silicon carbide, on a volume basis, as is present in a product where there is no substitution for the alumina.

The grain size of the alumina is important in that sufficient very fine "active" alumina must be present to permit sintering to produce adequate strength at a top firing temperature of from 1450° to 1535°C. This requires that the total dry mix contain from 10 to 40% of such finer than 4 micron alumina.

The remainder of the alumina should be of mixed sizes to provide the desired density in the final product, ranging up to 4 grit as a maximum.

A typical product of this invention has a modulus of elasticity of $27 \times 10^{10}$ dynes per square centimeter, as opposed to a comparable all alumina sintered body with a modulus of 75 to $100 \times 10^{10}$. The modulus of rupture is 1,200 p.s.i. at room temperature and 1500 p.s.i. at 1250°C. The modulus of elasticity of the products of this invention is less than $36 \times 10^{10}$ dynes per $cm^2$, and the cross bending strength is at least 1000 p.s.i.

In the preferred final product, some growth of the alumina crystals occurs in the firing operation. Accordingly, examination of typical products reveals that for optimum properties the alumina should be present in crystals finer than 10 microns to the extent of at least 8%, by weight of the body, and in particles less than 50 microns, at least 25% of the alumina by weight.

The strength of sintered alumina products increases inversely with their grain size, so it is desirable to have finely crystalline alumina in the product to increase the strength of the alumina bonds. Even though the alumina bond consists primarily of fine recrystallized alumina, the product of the invention is relatively weak and has a low modulus of elasticity. While the alumina bonds are strong, the product contains two phases (alumina and silicon carbide) with widely differing coefficients of expansion ($9 \times 10^{-6}/°C$. and $4.5 \times 10^{-6}/°C$. respectively). Such large differences must result in strains and cracks in the structure of the body. This in turn, explains the low modulus of elasticity and strength values. Yet it is this combination of high thermal conductivity, low modulus of elasticity, and cracked up strained structure which has better thermal shock resistance than prior art products.

For example, six-inch diameter discs of the invention product were compared in thermal shock with discs of commercial compositions of alumina, mullite, and silicon carbide. The discs were heated in a furnace to 1200°C and quenched in air in repeated cycles to failure by breaking. Only the invention product survived for 10 cycles.

What is claimed is:

1. A monolithic refractory shape consisting essentially of bonded particles of alumina and silicon carbide containing from 15 to 44% by weight of silicon carbide grains, 56 to 85% alumina grains, at least 25% of the alumina grains being finer than 50 microns in size, at least 8% of the body by weight is alumina grains finer than 10 microns in size, and at least 75% of the silicon carbide grains being coarser than 100 mesh.

2. A product as in claim 1 having from 0 to 20% of the alumina replaced by zirconia, the product containing less than 50% by volume of silicon carbide.

3. A product as in claim 1 in which the alumina contains less than 0.1% $Na_2O$, less than 4% silica, less than 0.5% iron, and less than 0.5% of RO type metal oxides.

4. A refractory shaped body composed essentially of a sintered alumina composition with coarse particles of silicon carbide dispersed through it, 75% by weight of said particles being coarser than 100 mesh, said body having a modulus of elasticity less than $36 \times 10^{10}$ dynes per $cm^2$, and a cross bending strength of at least 1000 p.s.i., said body containing from 15 to 44% by weight of silicon carbide.

5. A raw batch for making a refractory body prepared from a mixture of 15 to 44% of particulate silicon carbide at least 75% of which is coarser than 100 mesh, from 0 to 20% of particulate sintered or fused zirconia or zirconia-alumina, and 56 to 85% particulate alumina, said particulate alumina being both coarse and fine with from 10 to 40% of said fine alumina being a reactive alpha alumina with an average grain size of less than 4 microns, said raw batch having sufficient liquid and organic binders added to permit molding of the body by conventional ceramic forming methods.

6. A process for making a refractory product from the composition described in claim 5, comprising mixing the raw batch, forming it to shape in a mold, drying it, and firing it in a kiln to a temperature in the range from 1300° to 1535°C.

* * * * *